United States Patent
Novack et al.

(10) Patent No.: US 9,264,873 B2
(45) Date of Patent: Feb. 16, 2016

(54) MEDIA SERVICES WITH ACCESS CONTROL

(71) Applicant: AT&T Intellectual Property I, LP, Atlanta, GA (US)

(72) Inventors: Brian M Novack, St. Louis, MO (US); David Dunmire, Roswell, GA (US); Jason Hicks, Edwardsville, IL (US); Matthew A Rakers, Aviston, IL (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

(21) Appl. No.: 14/195,492

(22) Filed: Mar. 3, 2014

(65) Prior Publication Data

US 2014/0180821 A1 Jun. 26, 2014

Related U.S. Application Data

(63) Continuation of application No. 11/190,310, filed on Jul. 26, 2005, now Pat. No. 8,706,082.

(51) Int. Cl.
*H04M 1/66* (2006.01)
*H04W 4/18* (2009.01)
*G06Q 20/14* (2012.01)
(Continued)

(52) U.S. Cl.
CPC .............. *H04W 4/18* (2013.01); *G06Q 20/145* (2013.01); *G06Q 20/4014* (2013.01); *G06Q 30/0261* (2013.01); *G07F 17/16* (2013.01); *H04L 63/08* (2013.01)

(58) Field of Classification Search
CPC .............. G06Q 30/02; G06Q 30/0264; G06Q 30/0269; G06Q 20/28; H04H 60/33; H04H 60/45; H04H 20/103; H04H 60/27; H04H 4/001

USPC .......................................................... 455/411
See application file for complete search history.

(56) References Cited

U.S. PATENT DOCUMENTS 3,990,012 A 11/1976 Karnes
5,771,282 A 6/1998 Friedes
(Continued)

FOREIGN PATENT DOCUMENTS

| CA | 2160278 | 6/1996 |
| WO | 0133729 | 5/2001 |
| WO | 0133808 | 5/2001 |

OTHER PUBLICATIONS

"Wi-Fi Security at Work and on the Road", www.wifi.org/OpenSection/secure.asp?TID=2 . (Accessed Sep. 6, 2005), 7 pgs.
(Continued)

*Primary Examiner* — Kwasi Karikari
(74) *Attorney, Agent, or Firm* — Guntin & Gust, PLC; Joseph Hrutka

(57) ABSTRACT

Systems and methods are describe wherein a service provider provides media services that can include, but are not limited to, telephone, radio, interactive and television services. A user residence and/or a user receiving device are designated as a primary location or device for receiving the services of the service provider. An authorization center authenticates a request to provide the service(s) at one or more secondary location/device. The verification process can include, but is not limited to, password(s), Personal Identification Numbers (PIN) and biometric identifiers such as voice, retina, finger print and DNA.

20 Claims, 3 Drawing Sheets

(51) Int. Cl.
*G06Q 20/40* (2012.01)
*G07F 17/16* (2006.01)
*H04L 29/06* (2006.01)
*G06Q 30/02* (2012.01)

(56) References Cited

U.S. PATENT DOCUMENTS

| | | |
|---|---|---|
| 6,021,189 A | 2/2000 | Vu |
| 6,104,922 A | 8/2000 | Baumann |
| 6,115,821 A | 9/2000 | Newby |
| 6,233,736 B1 | 5/2001 | Wolzien |
| 6,335,927 B1 | 1/2002 | Elliott |
| 6,640,304 B2 | 10/2003 | Ginter |
| 6,792,323 B2 | 9/2004 | Krzyzanowski |
| 7,257,132 B1 | 8/2007 | Akamatsu |
| 2001/0039657 A1* | 11/2001 | Fopeano et al. .................. 725/9 |
| 2002/0056142 A1 | 5/2002 | Redmond |
| 2002/0064149 A1 | 5/2002 | Elliott |
| 2002/0111154 A1 | 8/2002 | Eldering |
| 2002/0144289 A1 | 10/2002 | Taguchi |
| 2002/0161633 A1 | 10/2002 | Jacob |
| 2003/0092452 A1 | 5/2003 | Youngs |
| 2003/0097655 A1* | 5/2003 | Novak ........................... 725/31 |
| 2003/0190908 A1 | 10/2003 | Craven |
| 2004/0123129 A1 | 6/2004 | Ginter |
| 2004/0203630 A1 | 10/2004 | Wang |
| 2005/0114711 A1 | 5/2005 | Hesselink |
| 2006/0259927 A1 | 11/2006 | Archarya |

OTHER PUBLICATIONS

The Global Information Assurance, "SPYRUS Media Contact", http://www.spyrus.com/company/technology.html, Accessed Sep. 6, 2005, 8 pgs.

* cited by examiner

MEDIA SERVICES WITH ACCESS CONTROL

CROSS-REFERENCE TO RELATED APPLICATION(S)

This application is a continuation of and claims priority U.S. patent application Ser. No. 11/190,310 to Novack et al. filed Jul. 26, 2005, the disclosure of which is hereby incorporated by reference in its entirety.

FIELD OF THE DISCLOSURE

This disclosure relates to providing services and, more particularly, the portability of media services.

BACKGROUND

Service providing companies such a television, radio, interactive media, Internet access and telephone companies typically contract with customers for services. The contracts can include basic services and optional enhancements.

Television services, such as cable and satellite, are associated with either a physical address and/or receiver device located at the physical address. For example, television service plans are semi-custom to allow a receiver device (set-top box) to access media content. Cable and satellite services can allow customers to select service plans that include basic service and enhanced services such as access to movie channels. Further, customer specific settings or profiles such as parental controls to prevent children from accessing undesired media content can be specified for the customer receiver device.

In addition to satellite television services, satellite radio services are also available. Similar to the satellite television and cellular telephone services, the satellite radio service allows a specific receiving device to access audio content. A customer can select a service plan that allows access to a selection of satellite radio stations.

Services and media delivery services are currently often associated with a customer and the customer's physical address or device. For example, service plans, such as long distance telephone rates, for wired telephone services are provided to a physical address. Similarly, cellular telephone services and plans are associated with specific phone devices. Calling cards are available which allow the user to charge telephone usage against a pre-paid, debit or credit account. The fees associated with the calling card are often excessive compared to contracted accounts for other telephone services. For example, a residential telephone service agreement may provide unlimited long distance calling at specified times. Further, cellular telephone service agreements often provide free incoming and outgoing calls up to a specified periodic limit.

BRIEF DESCRIPTION OF THE DRAWINGS

Reference will now be made to the accompanying drawings, which are not necessarily drawn to scale, and wherein.

DETAILED DESCRIPTION

In the following descriptions, for purposes of explanation, numerous specific details are set forth in order to provide a thorough understanding of the various embodiments. It will be evident, however, to one skilled in the art that embodiments of the invention may be practiced without making use of many of these specific details.

Figure 1:
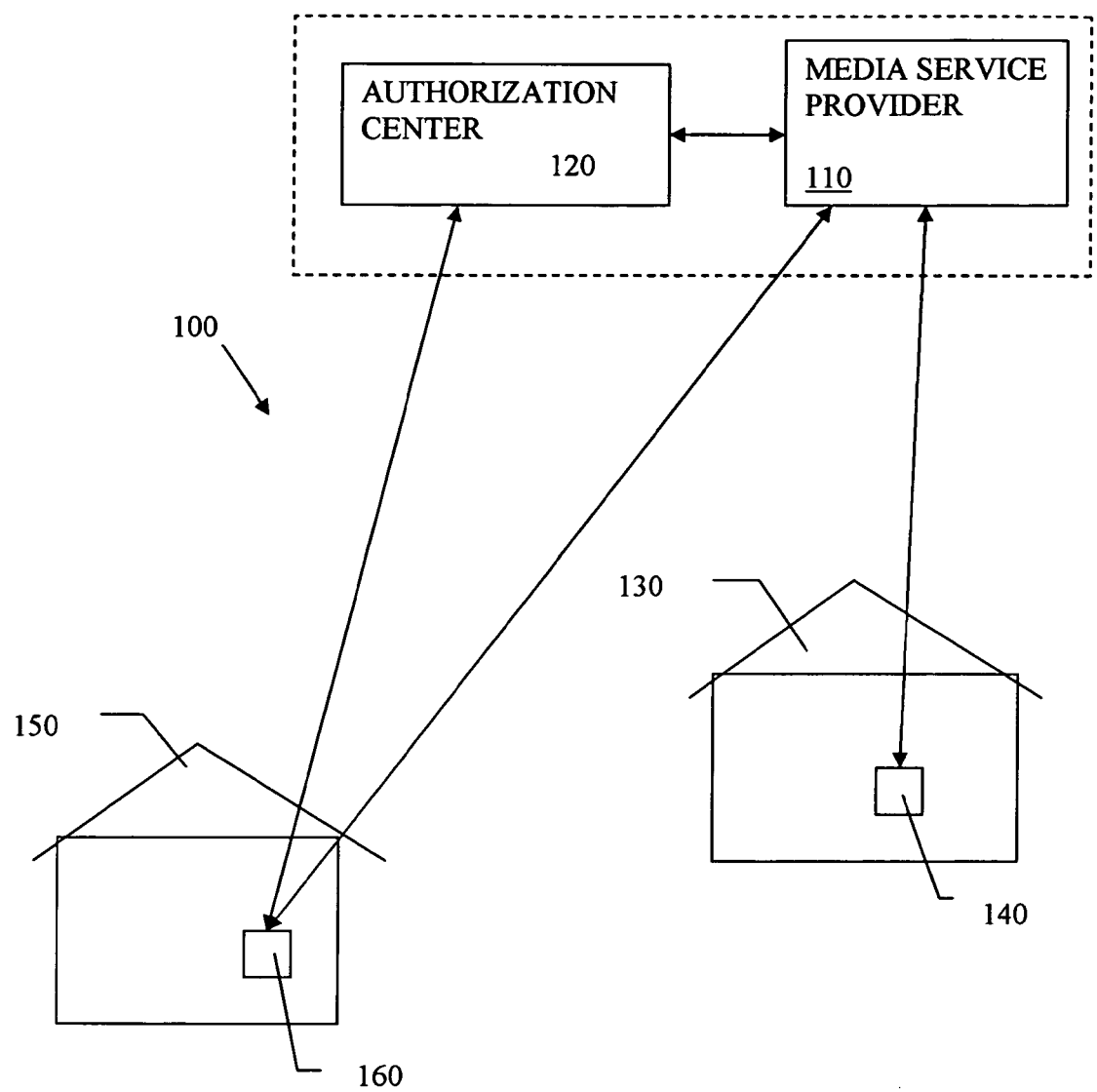
FIG. 1 illustrates service systems according to embodiments of the present invention.

A substantial limitation of the prior art service systems, as described above, is the association to a specific location or device. Embodiments of the present invention provide portability of services. Referring to FIG. 1, a service system 100 of an embodiment of the invention is described. The system includes a service provider 110. The service provider can include, but is not limited to, telephone, radio, interactive (including shopping and gaming), Internet access and television service providers, generally referred to herein as either service providers, or media service providers. A user residence 130 and/or a user receiving device 140 is designated as a primary location or device for receiving the services of the service provider. A secondary location 150 and/or secondary receiver 160 allows the user to receive the services of the service provider 110.

An authorization center 120 is provided to authenticate a request to provide the contracted services at the secondary location/device. In one embodiment the authorization center is a component of the service provider, as illustrated by the dashed line in FIG. 1. In another embodiment, the authorization center is separate from the service provider. The authorization center 120 verifies the identity of the user using a verification process. The verification process can include, but is not limited to, password(s), Personal Identification Numbers (PIN) and biometric identifiers such as voice, retina, finger print and DNA of the user.

Figure 2:
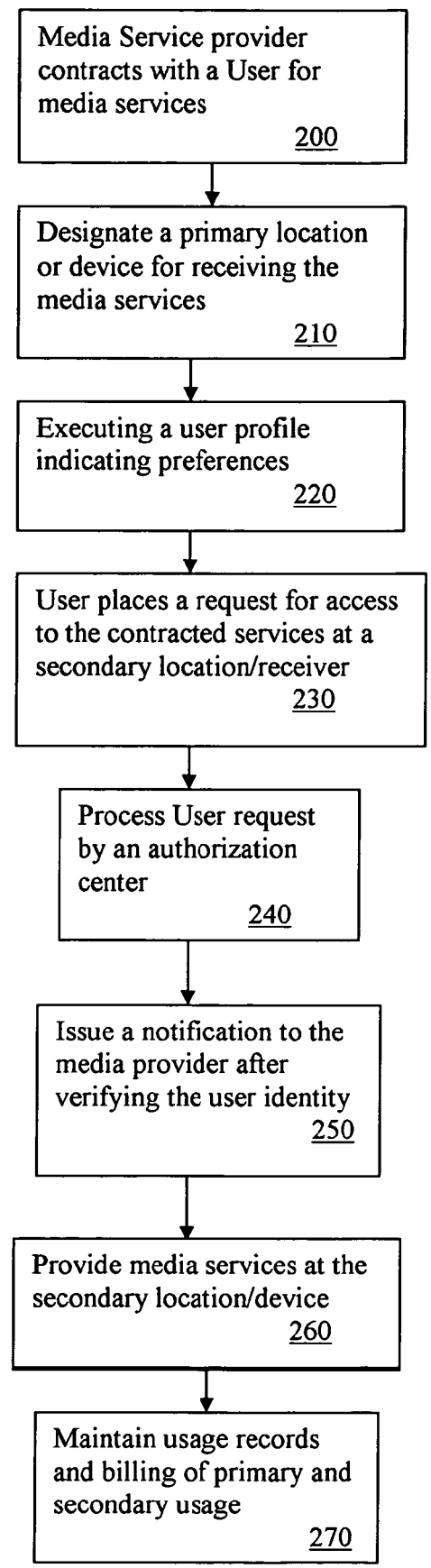
FIG. 2 is flow chart illustrating methods according to embodiments of the present invention.

One example method embodiment of the present invention is described with reference to the flowchart of FIG. 2. A media service provider such as a satellite television provider contracts with a user for services, at 200. The services can include access to specified media content, such as movie channels. The user can designate a primary location or device for receiving the services, at 210. Further, the contracted services can optionally include executing a user profile indicating preferences, at 220.

In this example, a primary satellite receiver can be designated at the user's residence. When the user is at a secondary location capable of receiving the services, the user places a request for access to the contracted services, at 230. For example, the user may be visiting a relative at a secondary location where the relative has a satellite television service, but has not contracted for access to the media content accessible via the user's contracted service.

At step 240, the user's request is processed by the authorization center to verify the identity of the user. If the authorization center is separate from the media service provider, a notification is issued by the authentication center to the media provider after verifying the user identity at 250. Based upon a positive identification, at step 260, the contracted services are provided at the secondary location/device.

In exchange for the services, the user typically pays a monetary fee. The fees can be paid using any compensation process, such as an invoice to a physical location, debit, credit or a direct transfer transaction. The invention is not limited to any specific fee payment systems. At step 270, service usage records and billing are maintained for the user, regardless of a location of the service usage.

In one embodiment, the services are provided at the requested secondary location while the service usage charges (if any) are maintained as if the services were used at the primary location. For example, the user may order a pay-per-view video via a satellite television media service. The video is viewed at the secondary location while the fee for the service is processed along with any other fees incurred by the user via the normal fee payment arrangement.

Embodiments of the invention can restrict access to contracted services to a single location or receiver at one time. That is, transferring the service to a secondary location prohibits access to the services at the primary location. In another embodiment, the primary location remains active while an additional service fee may be required to activate the secondary location. This embodiment can be used to authorize service to one or more secondary locations. For example, a parent can authorize services to a child location, such as a college dormitory. Further, the secondary location can be automatically terminated. For example, subsequently assessing the services at the primary location can terminate access at the secondary location. Alternately, a time limitation may trigger termination of the transferred service access.

In one embodiment, the user's profile is applied to the transferred service location. That is, the secondary location is treated as the primary location for purposes of profile preferences. For example, parental controls established for a child, language preferences and text captioning are applied to the services provided at the secondary location.

Again, the services are not limited to video services. The service provider can provide telephone communication services. The user can request that their contracted communication services be applied to a secondary telephone or device. As such, the user can apply contracted communication rates to any capable device.

In yet another embodiment, advertising content can be targeted to the identified user. That is, once the user's location is identified more personalized advertising can be provided. For example, a television service provider can provide advertising to the secondary location based upon the verification that the user is accessing the service. In addition to basic advertising, targeted advertising based upon the user's past preferences and the current location of the user can provide advertising for 'local' businesses near the user's current location.

Figure 3:
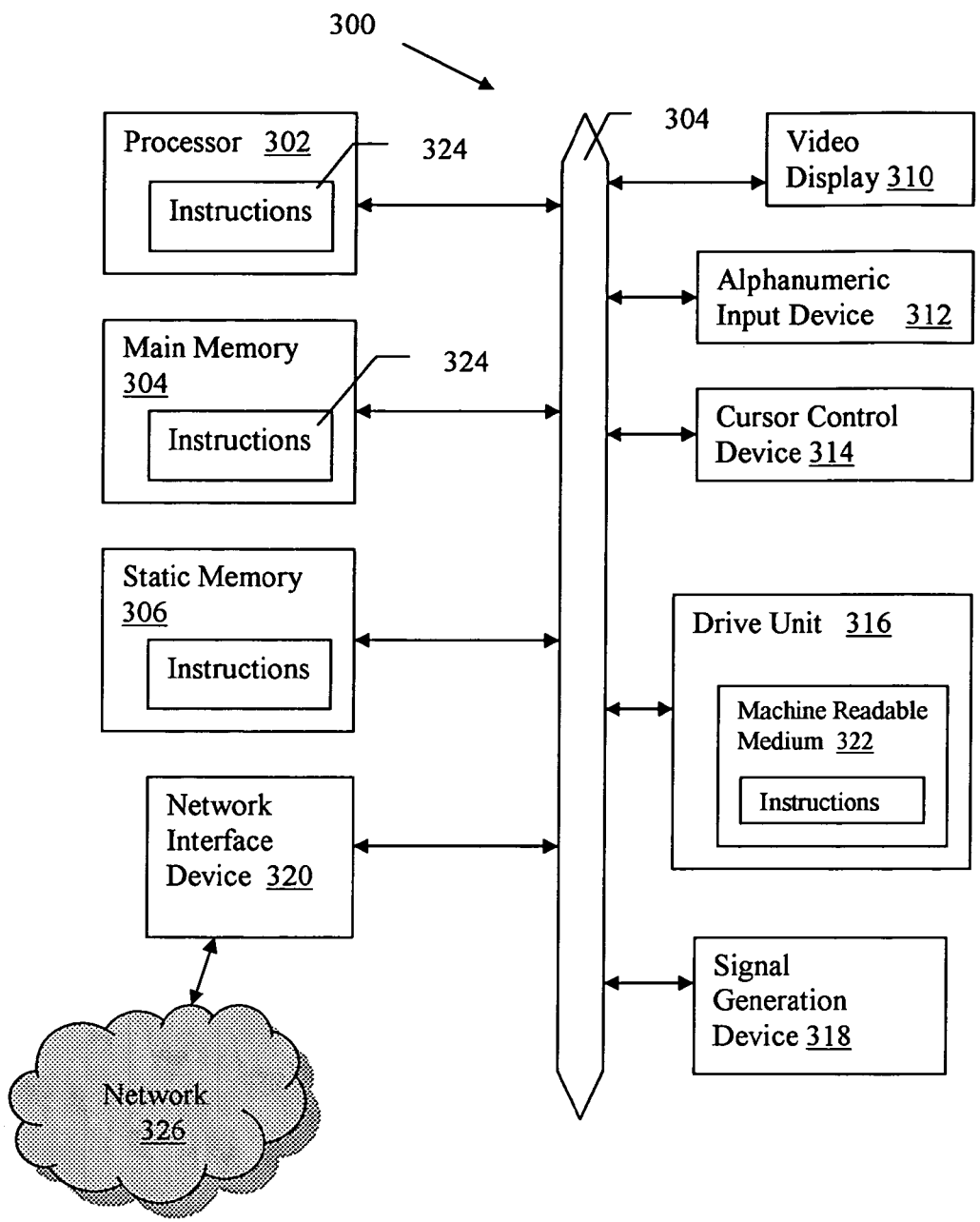
FIG. 3 is a diagrammatic representation of a machine in the form of a computer system according to embodiments of the present invention.

FIG. 3 is a diagrammatic representation of a machine in the form of a computer system 300 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU), or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated in herein above. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   providing, over a network by a system including a processor, media services to a primary media receiver and a primary voice communication device at a first location according to a subscription plan, wherein the media services comprise an internet access service and a voice communication service;
   receiving, by the system, a request for the media services, wherein the request includes identification information for a user, wherein the request is received over the network from a secondary media receiver at a second location, and wherein the first and second locations are remote from each other;
   obtaining, by the system, an authentication of the request based on the media services requested and the identification information of the user;
   enabling, by the system, access to the media services for the secondary media receiver and for a secondary voice communication device at the second location without providing video services at the second location, wherein the second location is not designated under the subscription plan to access the media services;
   determining advertising content that is associated with vendors within a target distance of the second location; and
   providing the advertising content with the media services.

2. The method of claim 1, comprising terminating access to the media services at the secondary media receiver responsive to detecting access to the media services at the primary media receiver, wherein the enabling of the access to the media services for the secondary media receiver and for the secondary voice communication device at the second location is without providing video-on-demand services at the second location.

3. The method of claim 1, comprising terminating access to the media services at the secondary media receiver responsive to expiration of a time period, wherein the enabling of the access to the media services for the secondary media receiver and for the secondary voice communication device at the second location is without providing video-on-demand services at the second location.

4. The method of claim 1, wherein the media services at the second location are subject to parental control filters applied at the secondary media receiver based on a user profile associated with the primary media receiver.

5. The method of claim 1, comprising combining records of service usage of the primary and secondary media receivers and the primary and secondary voice communication devices.

6. The method of claim 1, comprising combining records of service usage of the primary and secondary voice communication devices.

7. The method of claim 1, wherein access to the media services at both the primary and secondary locations at a same time invokes an additional service fee.

8. The method of claim 1, wherein operations of the system are managed by a first entity that is different from a second entity that performs the authentication of the request.

9. A non-transitory, machine-readable storage medium, comprising instructions, wherein responsive to executing the instructions, a processor performs operations comprising:
provided, over a network, media services to a primary media receiver and a primary voice communication device at a first location according to a subscription plan, wherein the media services comprise an internet access service and a voice communication service;
receiving a request for the media services, wherein the request includes identification information for a user, wherein the request is received over the network from a secondary media receiver at a second location, and wherein the first and second locations are remote from each other;
obtaining an authentication of the request based on the media services requested and the identification information of the user;
enabling access to the media services for the secondary media receiver and for a secondary voice communication device at the second location without providing video services at the second location, wherein the second location is not designated under the subscription plan to access the media services; and
combining records of service usage of the primary and secondary media receivers and the primary and secondary voice communication devices.

10. The non-transitory, machine-readable storage medium of claim 9, wherein the operations further comprise:
determining advertising content that is associated with vendors within a target distance of the second location; and
providing the advertising content with the media services.

11. The non-transitory, machine-readable storage medium of claim 9, wherein the operations further comprise terminating access to the media services at the secondary media receiver responsive to detecting access to the media services at the primary media receiver, wherein the enabling of the access to the media services for the secondary media receiver and for the secondary voice communication device at the second location is without providing video-on-demand services at the second location.

12. The non-transitory, machine-readable storage medium of claim 9, wherein the operations further comprise terminating access to the media services at the secondary media receiver responsive to expiration of a time period, wherein the enabling of the access to the media services for the secondary media receiver and for the secondary voice communication device at the second location is without providing video-on-demand services at the second location.

13. The non-transitory, machine-readable storage medium of claim 9, wherein the media services at the second location are subject to parental control filters applied at the secondary media receiver based on a user profile associated with the primary media receiver.

14. The non-transitory, machine-readable storage medium of claim 9, wherein the operations further comprise combining records of service usage of the primary and secondary voice communication devices.

15. The non-transitory, machine-readable storage medium of claim 9, wherein access to the media services at both the primary and secondary locations at a same time invokes an additional service fee.

16. The non-transitory, machine-readable storage medium of claim 9, wherein the operations of the processor is managed by a first entity that is different from a second entity that performs the authentication of the request.

17. An apparatus, comprising:
a memory that stores instructions; and
a processor coupled to the memory, wherein responsive to executing the instructions, the processor performs operations comprising:
providing, over a network, media services to a primary media receiver and a primary voice communication device at a first location according to a subscription plan, wherein the media services comprise an internet access service and a voice communication service;
receiving a request for the media services, wherein the request includes identification information for a user, wherein the request is received over the network from a secondary media receiver at a second location, and wherein the first and second locations are remote from each other;
obtaining an authentication of the request based on the media services requested and the identification information of the user; and
enabling access to the media services for the secondary media receiver and for a secondary voice communication device at the second location without providing video services at the second location, wherein the second location is not designated under the subscription plan to access the media services,
wherein the operations are managed by a first entity that is different from a second entity that performs the authentication of the request.

18. The apparatus of claim 17, wherein the operations further comprise:
determining advertising content that is associated with vendors within a target distance of the second location; and
providing the advertising content with the media services.

19. The apparatus of claim 17, wherein the operations further comprise terminating access to the media services at the secondary media receiver responsive to detecting access to the media services at the primary media receiver, wherein the enabling of the access to the media services for the secondary media receiver and for the secondary voice communication device at the second location is without providing video-on-demand services at the second location.

20. The apparatus of claim 17, wherein the operations further comprise terminating access to the media services at the secondary media receiver responsive to expiration of a time period, wherein the enabling of the access to the media services for the secondary media receiver and for the secondary voice communication device at the second location is without providing video-on-demand services at the second location.

* * * * *